United States Patent
Sen et al.

(10) Patent No.: US 10,031,209 B2
(45) Date of Patent: Jul. 24, 2018

(54) LOCALIZATION USING TIME-OF-FLIGHT

(71) Applicant: Hewlett-Packard Development Company, L.P., Houston, TX (US)

(72) Inventors: Souvik Sen, Palo Alto, CA (US); Jung Gun Lee, Palo Alto, CA (US); Haiqing Jiang, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 298 days.

(21) Appl. No.: 14/888,199

(22) PCT Filed: Aug. 30, 2013

(86) PCT No.: PCT/US2013/057669
§ 371 (c)(1),
(2) Date: Oct. 30, 2015

(87) PCT Pub. No.: WO2015/030816
PCT Pub. Date: Mar. 5, 2015

(65) Prior Publication Data
US 2016/0282448 A1 Sep. 29, 2016

(51) Int. Cl.
*G01S 1/24* (2006.01)
*G01S 3/02* (2006.01)
*G01S 5/14* (2006.01)

(52) U.S. Cl.
CPC .................................. *G01S 5/14* (2013.01)

(58) Field of Classification Search
CPC ............................. G01S 5/14; H04W 64/00
USPC .............. 342/387, 457, 458, 463; 455/456.1, 455/456.2
See application file for complete search history.

(56) References Cited

U.S. PATENT DOCUMENTS

| | | |
|---|---|---|
| 7,532,895 B2 | 5/2009 | Hrastar |
| 8,150,421 B2 | 4/2012 | Ward et al. |
| 8,335,173 B2 | 12/2012 | Hart et al. |
| 2009/0149198 A1 | 6/2009 | Nam et al. |
| 2010/0150117 A1 | 6/2010 | Aweya et al. |
| 2011/0051608 A1 | 3/2011 | Lee et al. |
| 2011/0110242 A1 | 5/2011 | Nixon et al. |
| 2012/0013508 A1 | 1/2012 | Bao et al. |
| 2012/0320787 A1 | 12/2012 | Sugar et al. |

FOREIGN PATENT DOCUMENTS

WO  WO-2012/114304 A1  8/2012

OTHER PUBLICATIONS

Hyuk Lim et al., "Zero Configuration, Robust Indoor Localization: Theory and Experimentation," Technical Report No. UIUCDCS-R-2005-2629, Aug. 2005, pp. 1-13.

(Continued)

*Primary Examiner* — Dao L Phan
(74) *Attorney, Agent, or Firm* — Brooks, Cameron & Huebsch, PLLC

(57) ABSTRACT

A first distance between a first node and a target node is computed based on a first time-of-flight (ToF) of a communication sequence between the first node and the target node. A second distance between a second node and the target node is computed based on a second ToF of the communication sequence between the first node and the target node, as recorded by the second node. A location of the target node is determined based on the first distance and the second distance.

15 Claims, 4 Drawing Sheets

(56) References Cited

OTHER PUBLICATIONS

International Search Report and Written Opinion, International Application No. PCT/US2013/057669, dated May 19, 2014, pp. 1-11.
Nils Ole Tippenhauer, "Physical-Layer Security Aspects of Wireless Localization," 2012, pp. 1-201, Diss. ETH No. 20344, ETH Zurich.

LOCALIZATION USING TIME-OF-FLIGHT

BACKGROUND

Localization techniques are used to determine an object's position on the earth's surface. Extensive interest in location-aware services such as location-based advertising has driven many localization techniques. Some localization techniques include wireless local area network (WLAN) fingerprint techniques, crowdsourcing techniques, and site-survey techniques.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Figure 1:
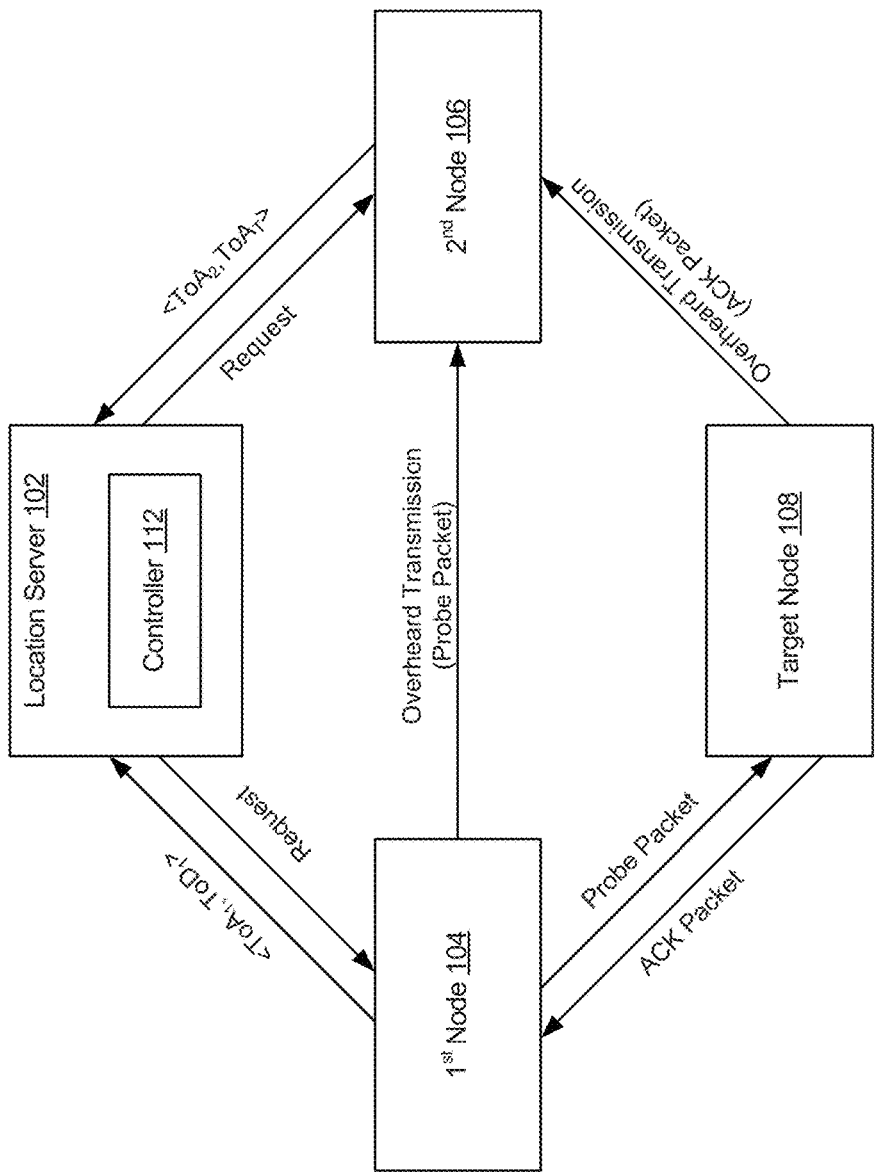
FIG. 1 is a block diagram of a location server including a controller to determine a location of a target node using time-of-flight (ToF) information, according to one example.

The rapid growth of location-based applications has spurred extensive research on localization techniques. However, localization particularly indoor localization remains a challenging problem, because accurate localization techniques come at the expense of cumbersome site-survey or expensive additional infrastructure. For example, wireless local area network (WLAN) (e.g., Wi-Fi®) fingerprint technique often requires expensive and meticulous wardriving. Such wardriving is often not a onetime cost because the indoor radio frequency (RF) environment can change due to changes in layouts and objects, or due to frequent and automatic wireless configuration changes. Attempts to eliminate the wardriving requirements often come at the expense of performance or widespread applicability. As another example, crowdsourcing techniques (i.e., obtaining location information by soliciting contributions from a large group of people) are unattractive because of a lack of clear user incentive to share sensor and location information. Thus, the tradeoff between accuracy, pervasiveness, and cost has remained a major challenge in designing a widely deployable localization (e.g., indoor localization) system.

Recently, time-of-flight (ToF) based localization technique has attracted a lot of attention. ToF captures the propagation delay between two wireless communication nodes. For example, ToF captures the propagation delay between an access point and a client device, which is the amount of time that a transmitted signal from the access point takes to arrive at the client. Thus, using ToF, it is possible to compute the distance between the access point and the client device. However, the location of the client device is dependent on the availability of distance information from multiple access points (i.e., distance between multiple access points and the client device). In some cases, for example, distance measurements may be required from approximately ten access points. Further, ToF based distance computation rely on a probe packet-acknowledgement (ACK) packet exchange between the access point and the client device. Consequently, to calculate the location of the client device, a location server, for example, has to initiate multiple probe-ACK packet exchanges between different access points and the client device, which may create a scalability problem. For example, if the number of client devices seeking location services from the location server is high, the wireless network may get overwhelmed quickly due to the large number of probe-ACK packet exchanges that may be needed for ToF based distance computation.

Accordingly, examples described herein address the above challenges of ToF based localization technique. For example, the described examples address the scalability issues associated with ToF based localization technique and make ToF localization technique more attractive to deploy. To illustrate, rather than sending one probe packet per client (and receiving corresponding ACK packets), per access point, every second, the described solution significantly reduces the amount of traffic, thereby reducing the traffic overhead by orders of magnitude.

In one example, a method of locating a wireless communication node includes computing a first distance between a first node and a target node based on a first time-of-flight (ToF) of a communication sequence between the first node and the target node. The method includes computing a second distance between a second node and the target node based on a second ToF of the communication sequence between the first node and the target node, as recorded by the second node. The method also includes determining a location of the target node based on the first distance and the second distance.

In another example, a location server includes a controller to compute a first time-of-flight (ToF) value based on a time-of-departure (ToD) that indicates when a probe packet is transmitted from a first node to a target node and a first time-of-arrival (ToA) that indicates when an acknowledgement (ACK) packet is received at the first node in response to the probe packet. The controller is to compute a second ToF value based on a second ToA that indicates when the probe packet from the first node is received at a second node and a third ToA that indicates when the ACK packet from the target node is received at the second node. The controller is also to compute a first distance of the target node from the first node based on the first ToF value, to compute a second distance of the target node from the second node based on the second ToF value, and to determine a location of the target node based on the first distance and the second distance.

In another example, a non-transitory computer-readable storage medium includes instructions that, when executed by a processor of a location server, causes the processor to compute a first time-of-flight (ToF) value based on a time-of-departure (ToD) that indicates when a probe packet is transmitted from a first node to a target node and a first time-of-arrival (ToA) that indicates when an acknowledgement (ACK) packet from the target node is received at the first node in response to the probe packet. The instructions are executable to compute a second ToF value based on a second ToA that indicates when the probe packet from the first node is received at a second node and a third ToA that indicates when the ACK packet from the target node is received at the second node. The instructions are executable to compute a first distance of the target node from the first node based on the first ToF value, to compute a second distance of the target node from the second node based on the second ToF value, and to determine a location of the target node based on the first distance and the second distance.

As used herein, "node" is any device that serves as a connection point, either as a redistribution point or a communication endpoint of a network. Thus, a node is capable of sending, receiving, or forwarding signal (i.e., data or packets) over a communication channel. A node can be, for example, an access point, modem, hub, bridge, switch, host device, client device, router, workstation, or a server. As used herein, a "target node" is a node whose location is to be determined. The target node can be, for example, a node that depends on or associates with another node for network connection and/or services. A target node can be, for example, a client device such as a mobile device, a smartphone, a tablet, a laptop, or any other computing device. As used herein, "time-of-flight" or "ToF" is a propagation delay between two nodes. Thus, ToF measures the time it takes for a signal to be transmitted from one node to the other. As used herein, "time-of-departure" or "ToD" is the time that a signal is transmitted from one node to the other, as measured and recorded by the transmitting node. As used herein, "time-of-arrival" or "ToA" is the time that a signal is received at a node.

With reference to the figures, FIG. 1 is a block diagram of a location server including a controller to determine a location of a target node using ToF information, according to one example. Location server 102 may be, for example, any computing device configured to determine a location of target node 108. For example, target node 108 can register with location server 102 for location based services and/or location determination. Location server 102 can be connected to a first node 104 and a second node 106 over a wired backbone, for example. Location server 102 can include a controller 112 for determining the location of the target node 108. Controller 112 can be hardware and/or hardware configured to determine the location of target node 108, for example, based on time-of-flight (ToF) information.

First node 104 may be, for example, a wireless access point, a base station, an ad-hoc device, or any other communication device that serves and/or provides a plurality of target nodes (or client devices) such as target node 108 with access to a network (e.g. cellular network, wireless local area network, ad-hoc network, etc). Target node 108 may be, for example, a cellular device, a laptop, a smartphone, a desktop PC, a personal digital assistant (PDA), another access point, or any other computing device that may depend on the first node 104 for network access and/or services. Target node 108 may be fixed, mobile, or portable. Second node 106, like first node 104, may be an access point, a base station, an ad-hoc device, or any other communication device within range of the first node 104 and/or the target node 108. Thus, second node 106 may be a neighboring device that can overhear communications (e.g., probe packets and acknowledgement (ACK) packets) between the first node 104 and the target node 108. In some examples, any one of first node 104 and second node 106 can be the location server 102.

Controller 112 may be configured to determine the location of the target node 108 based on ToF information of a transmission between the first node 104 and the target node 108, and based on ToF information of the same transmission, as observed/recorded by the second node 106, where the transmission can be a probe packet-ACK packet exchange.

ToF captures the propagation delay between a transmitter and a receiver. Thus, ToF describes the amount of time that a transmitted signal takes to arrive at the receiver, or the round trip time of the signal. ToF may be computed from time-of-arrival (ToA) information and time-of-departure (ToD) information of the signal.

To determine the location of the target node 108 or to update the location of the target node 108, location server 102 may send a request for ToD and ToA information to the first node 104 and to the second node. In response to the request, first node 104 sends a probe packet to the target node 108 and registers the ToD of the probe packet. The ToD captures the time when the probe packet is transmitted from the physical layer (PHY) of the first node 104. The target node 108 receives the probe packet and may generate an ACK packet in response to the probe packet, after a predefined duration of time referred to as a short interframe space (SIFS). SIFS is a small interval between a data frame (e.g., the probe packet) and its acknowledgement. For example, In IEEE 802.11n standard, SIFS is fixed at 16 microseconds. ToA captures the precise time when the ACK packet arrives at the first node 104. Thus, the ToF of the probe-ACK packet exchange between the first node 104 and the target node 108 can be computed as:

$$ToF=(ToA-ToD-SIFS)/2 \qquad \text{Equation (1)},$$

where the dividing factor of 2 represents that the signal travels from the first node 104 to the target node 108 and back. Since wireless signals travel at the speed of light (c), the distance between the first node 104 and the target node 108 can be computed as:

$$Distance=ToF*c \qquad \text{Equation (2)},$$

where c is the speed of light (299, 792, 458 meters per second). As described above, the distance between the first node 104 and the target node 108 can be determined based on the probe-ACK packet exchange. However, a single distance reading between the first node 104 and the target node 108 may not accurately localize the target node 108, because localization techniques may require distance values between at least three nodes (e.g., access points) and the target node 108 to localize the target node 108. Determining the location of a client device in such a manner is known as multilateration (i.e., using at least 3 access points). Mathematically, multilateration solves a system of non-linear equations involving the unknown location of the client ($L_x$, $L_y$) and its estimated distance from different access points, based on the equation:

$$\|<AP_{i,x}, AP_{i,y}>-<L_x,L_y>\|_2=d_i \qquad \text{Equation (3,}$$

where i=1 . . . n, where n is the number of APs (access points) and $<AP_{i,x}, AP_{i,y}>$ are the known AP coordinates (i.e., x and y coordinates of the APs), and where $d_i$ is the distance between the APs and the client.

Accordingly, to compute the distance of the target node 108 from the second node 106, location server 102 can determine ToF information of the same probe-ACK packet exchange between the first node 104 and the target node 108, as observed by the second node 106, thereby executing one probe-ACK packet compared to several probe-ACK packets. Thus, instead of incurring a probe-ACK exchange for each node measuring the target node's distance, the described examples utilize the probe-ACK exchange by the first node 104 with the target node 108, where one or more second nodes 106 listen or observe the probe-ACK exchange and record the associated ToF information (e.g., ToA of the probe packet and ToA of the ACK packet at the second node 106).

Figure 2:
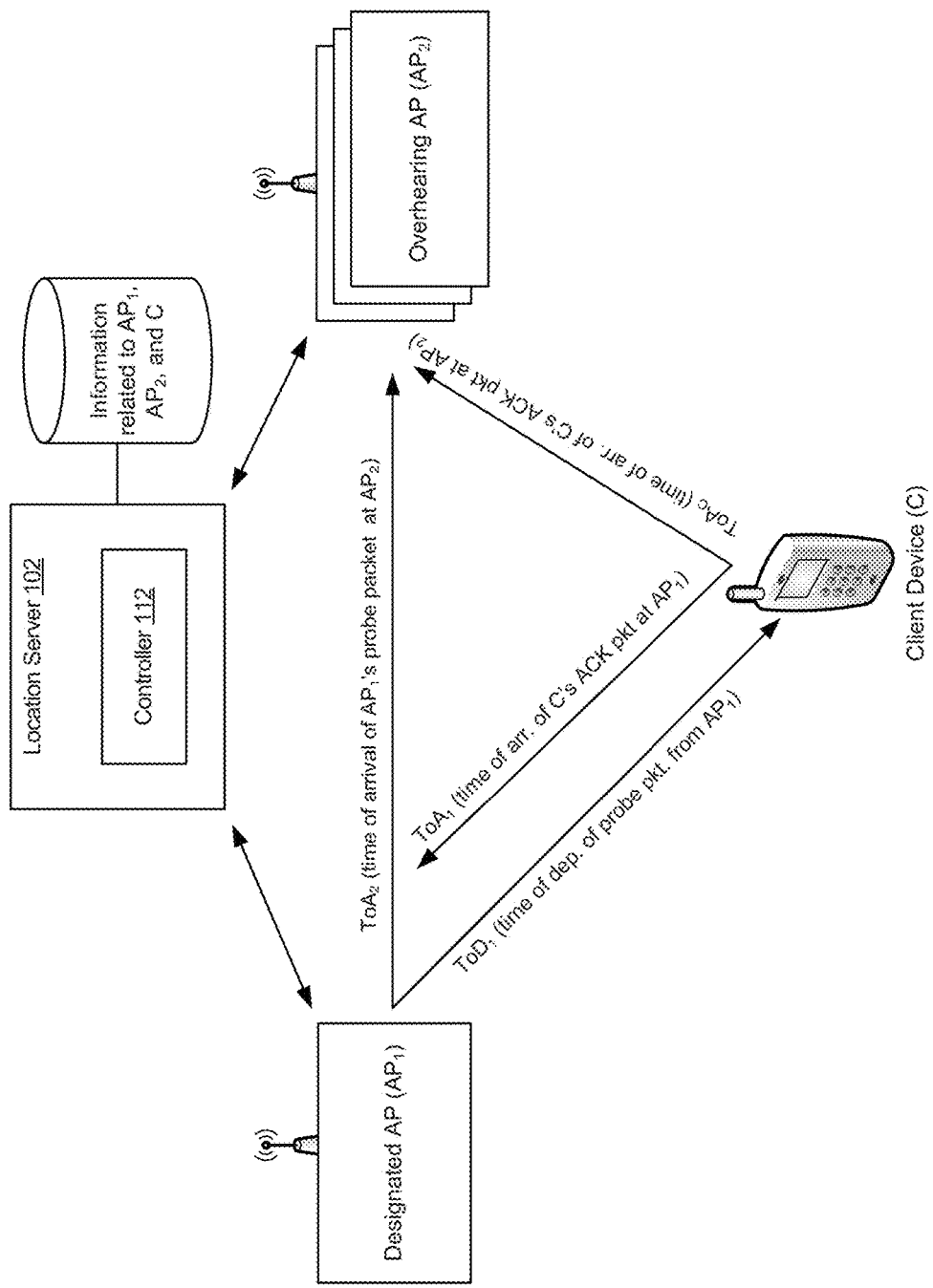
FIG. 2 is a block diagram illustrating a designated access point communicating with a client device, and an overhearing access point observing the communication, according to one example.

Because the second node 106 is not involved in a probe-ACK exchange with the target node 108, the overhead on the network traffic is significantly reduced, thereby providing a scalable solution for localizing the target node using ToF information. FIG. 2 describes in further detail how ToF information from the second node 106 is computed for determining the distance between the target node 108 and the second node 106.

FIG. 2 is a block diagram illustrating a designated access point communicating with a client device, and an overhearing access point observing the communication, according to one example. In the example of FIG. 2, client device C may be associated with an access point ($AP_1$). Thus, $AP_1$ may be a designated AP of the client device C, where the client device C may rely on $AP_1$ for network access and/or services. FIG. 2 further includes one or more overhearing access points ($AP_2$) within a transmission range of the client device C and $AP_1$ and can record a time-of-arrival (ToA) of transmissions between the client device C and $AP_1$.

As explained above, ToF based localization techniques may require a network to incur a probe-ACK exchange for each AP measuring the client device's distance. Accordingly, the amount of data due to the probe-ACK exchange may become overwhelming for the network as the number of APs distance information required increases, thereby making ToF based localization unscalable. Further, as the number of client devices seeking localization increases, the bandwidth of the network may become easily saturated. Moreover, due to the mobility of the client device, it may be necessary to send the probe-ACK packet exchange between the client device and the APs every second. Accordingly, the described examples significantly reduce the network traffic by leveraging the probe-ACK exchange between the designated AP and the client device C, where only the designated AP (i.e., $AP_1$) executes the probe-ACK exchange, and all other APs (i.e., $AP_2$) listen and record the transmission.

Client device C may register with location server 102 for location based services. Location server 102 may maintain a database (e.g., a table) containing information about the client device's MAC address, an AP the client is associated with (i.e., designated AP or $AP_1$), and the APs which can overhear a transmission from the client and the designated AP (i.e., overhearing APs or $AP_2$). Further, the location server 102 may maintain a table containing the location of the APs, the client's last known location, and the last time the client's location was computed. In some examples, any one of the APs can be the location server 102.

When the location server 102 needs to determine the location of the client device, the location server 102 may send a request for time-of-departure (ToA) and time-of-arrival (ToA) information to the designated AP (i.e., $AP_1$) and to all the overhearing AP (i.e., $AP_2$). In response to the request for data, $AP_1$ transmits a probe packet to the client device C and records the ToD of the probe packet. In response to the probe packet, client device C transmits an ACK packet to $AP_1$. $AP_1$ records the ToA of the ACK packet. $AP_1$ transmits the ToD and ToA information to the location server 102 and the location server computes the ToF and distance of the client device C from the designated AP, $AP_1$, using Equations (1) and (2), respectively.

Location server 102 determines the distance between $AP_2$ (i.e., the overhearing AP) and the client device C from the probe-ACK packet exchange between $AP_1$ (i.e., the designated AP) and the client device C. The following examples describe parameters used for computing the ToF and subsequently the distance between $AP_2$ using the probe-ACK packet exchange between $AP_1$ and the client device C. $AP_2$ records the ToA of the probe packet from $AP_1$ and the ToA of the ACK packet from the client device C. Thus, the ToA of the probe packet can be defined by the following equation:

$$ToA_2 = ToD_1 + E_{1,2} + ToF_{1,2} \quad \text{Equation (4)},$$

where $ToD_1$ is the ToD of the probe packet from $AP_1$, $ToA_2$ is the ToA of the probe packet at $AP_2$, $ToA_1$ is the ToA of the ACK packet from the client device at $AP_1$, and $ToA_C$ is the ToA of the same ACK packet at $AP_2$. It should be noted that it is not necessary for $AP_1$ and $AP_2$ to be time synchronized, because as $E_{1,2}$ captures the difference between the clocks of $AP_1$ and $AP_2$. $ToF_{1,2}$ is the ToF (or propagation delay) between $AP_1$ and $AP_2$. $ToA_C$ captures the ToA of the ACK packet at $AP_2$. Since the client device C will start transmitting the ACK packet after a predetermined duration after it receives the probe packet (i.e., the SIFS duration), according to the clock at $AP_1$, the client device C will start transmitting the ACK at:

$$ToD_1 + ToF_{1,C} + SIFS \quad \text{Equation (5)},$$

where $ToF_{1,C}$ captures the ToF between $AP_1$ and the client device C, which can be computed as $(ToA_1 - ToD_1 - SIFS)/2$ (based on Equation (1)). Thus, according to $AP_2$, the ToA of the ACK at $AP_2$ is:

$$ToA_C = ToD_1 + ToF_{1,C} + SIFS + E_{1,2} + ToF_{2,C} \quad \text{Equation (6)},$$

where $ToF_{2,C}$ is the ToF between $AP_2$ and client device C, and where $ToF_{2,C}$ is usable by the location server 102 for computing the distance between $AP_2$ and client device C. Thus, from Equations (4) and (6), $ToF_{2,C}$ can be computed as:

$$ToF_{2,C} = ToA_C + ToF_{1,2} - ToA_2 - ToF_{1,C} SIFS \quad \text{Equation (7)}.$$

It should be noted that the location server 102 knows the value of all the terms on the right hand side of Equation (7) (i.e., $ToA_C$, $ToF_{1,2}$, $ToA_2$, $ToF_{1,C}$, and SIFS) based on information maintained and/or computed by the location server 102. Hence, the distance between $AP_2$ and the client device C can be computed using Equation (2). In this manner, the location server 102 can compute the distance between the client device C and all overhearing APs. Using the computed distances, the location server 102 can determine the location of the client device C using Equation (3).

To maintain information regarding $AP_1$ and $AP_2$, the location server 102 can periodically receive reports of transmissions (i.e., probe-ACK packet exchange) from $AP_1$ and reports of overheard transmissions (i.e., the probe-ACK packet exchange) from $AP_2$. For example, such reports may contain the MAC addresses of the transmitters that the APs receive packets from (e.g., client device C or neighboring APs). The location server 102 may use this information to determine the set of overhearing APs. Further, each AP may send a list containing the MAC addresses of the client(s) which are associated with it, which the location server 102 uses to maintain designated AP information for each client.

Figure 3:
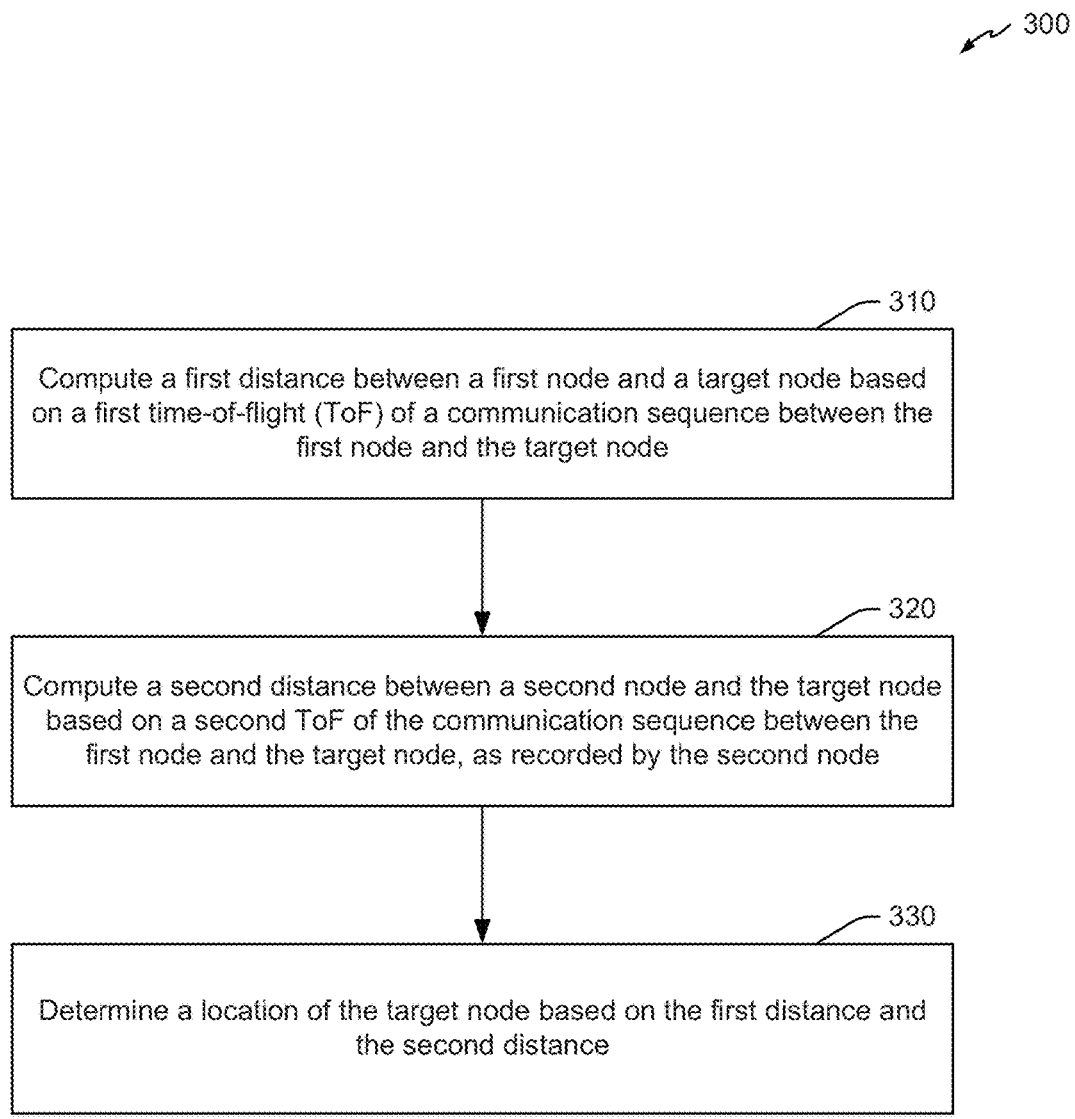
FIG. 3 is a flowchart of a method for determining a location of a target node using ToF information, according to one example.

FIG. 3 is a flowchart of a method for determining a location of a target node using ToF information, according to one example. Method 300 may be implemented, for example, in the form of executable instructions stored on a non-transitory computer-readable storage medium and/or in the form of electronic circuitry.

Method 300 includes computing a first distance between a first node and a target node based on a first time-of-flight (ToF) of a communication sequence between the first node and the target node, at 310. For example, the first ToF is computed based on a time-of departure (ToD) of a probe packet transmitted from the first node to the target node, and based on a time-of-arrival (ToA) of an ACK packet transmitted from the target node to the first node in response to the probe packet. The communication sequence includes the probe-ACK packet exchange between the first node and the target node. The target node can be a client device such as a mobile device, and the first node can be a designated access point or an access point associated with the client device and that provides the client device with access to a network, for example.

Method 300 includes computing a second distance between a second node and the target node based on a second ToF of the communication sequence between the first node and the target node, as recorded by the second node, at 320. For example, the second ToF is computed based on a time-of-arrival (ToA) of the probe packet at the second node, and based on the time-of-arrival (ToA) of the ACK packet at the second node. The second node can be another access point such as an overhearing access point or a neighboring access point of the client device and the designated/associated access point that can overhear transmissions between the designated/associated access point and the client device.

Method 300 also includes determining a location of the target node based on the first distance and the second distance, at 330. For example, the location of the target node can be determined based on the distance between the target node and the first node, and based on the distance between the target node and the second node. In some examples, the second node includes at least two nodes.

Figure 4:
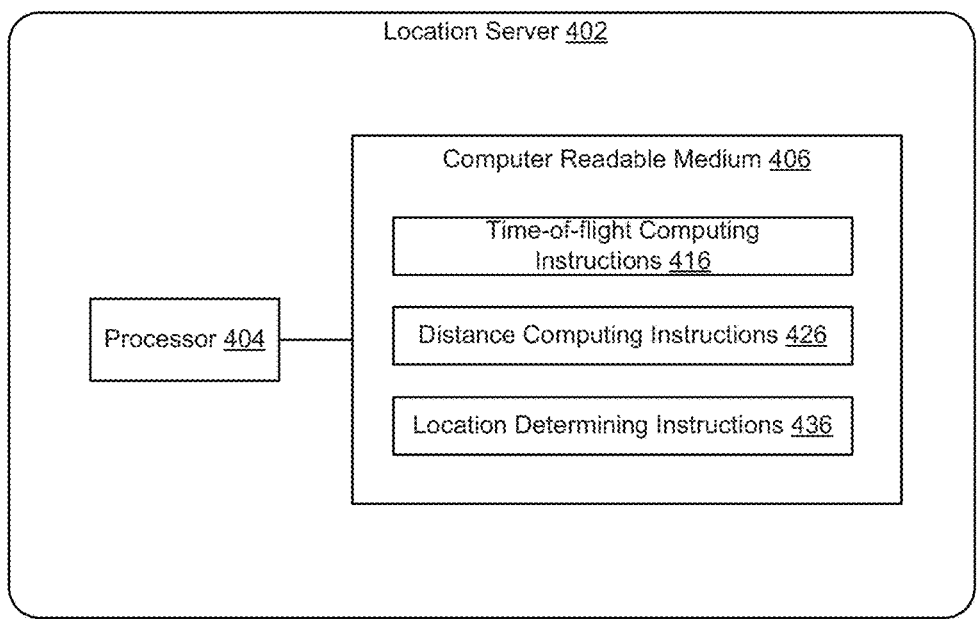
FIG. 4 is a block diagram of location server including a computer-readable medium having instructions for determining a location of a target node using ToF information, according to one example.

FIG. 4 is a block diagram of a location server including a computer-readable medium having instructions for determining a location of a target node using ToF information, according to one example. Location server 402 can include a non-transitory computer-readable medium 406. Medium 406 can include instructions 416-436 that, if executed by a processor 404, can cause the processor 404 to perform the functionality of location server 402.

For example, time-of-flight computing instructions 416 are executable to compute a first time-of-flight (ToF) value based on a time-of-departure (ToD) that indicates when a probe packet is transmitted from a first node to a target node and a first time-of-arrival (ToA) that indicates when an ACK packet is received at the first node in response to the probe packet. Time-of-flight computing instructions 416 are also executable to compute a second ToF value based on a second ToA that indicates when the probe packet from the first node is received at a second node and a third ToA that indicates when the ACK packet from the target node is received at the second node.

Distance computing instructions 426 are executable to compute a first distance of the target node from the first node based on the first ToF value, and to compute a second distance of the target node from the second node based on the second ToF value. Location determining instructions 436 are executable to determine a location of the target node based on the first distance and the second distance.

The techniques described above may be embodied in a computer-readable medium for configuring a computing system to execute the method. The computer-readable media may include, for example and without limitation, any number of the following non-transitive mediums: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet, just to name a few. Other new and obvious types of computer-readable media may be used to store the software modules discussed herein. Computing systems may be found in many forms including but not limited to mainframes, minicomputers, servers, workstations, personal computers, notepads, personal digital assistants, various wireless devices and embedded systems, just to name a few.

In the foregoing description, numerous details are set forth to provide an understanding of the present invention. However, it will be understood by those skilled in the art that the present invention may be practiced without these details. While the invention has been disclosed with respect to a limited number of examples, those skilled in the art will appreciate numerous modifications and variations therefrom. It is intended that the appended claims cover such modifications and variations as fall within the true spirit and scope of the invention.

What is claimed is:

1. A method of locating a wireless communication node comprising:
    computing a first distance between a first node and a target node based on a first time-of-flight (ToF) of a communication sequence between the first node and the target node, wherein the first distance between the first node and the target node is determined by a controller based on the first ToF value;
    computing a second distance between a second node and the target node based on a second ToF of the communication sequence between the first node and the target node, as recorded by the second node; and
    determining a location of the target node based on the first distance and the second distance, wherein the first node registers a time-of-departure (ToD) based on a physical layer of the first node, and the target node registers time-of-arrival (ToA) based on an arrival of an acknowledgement (ACK) packet from the first node.

2. The method of claim 1, wherein the first node includes an active node engaged in the communication sequence with the target node, and wherein the second node includes a passive node overhearing the communication sequence between the first node and the target node.

3. The method of claim 2, wherein the communication sequence includes a probe packet transmitted from the first node to the target node and an acknowledgement (ACK) packet transmitted from the target node to the first node responsive to the probe packet, and wherein the ACK packet is transmitted after a predetermined duration of time after receipt of the probe packet.

4. The method of claim 2, wherein the first ToF is based on a time-of-departure (ToD) of the probe packet from the first node, a first time-of-arrival (ToA) of the ACK packet at the first node, and the predetermined duration of time.

5. The method of claim 1, wherein the second ToF is based on a second ToA of the ACK packet at the second node and a third ToA of the probe packet at the second node.

6. The method of claim 5, wherein the second ToA of the ACK packet at the second node includes a timing difference between the first node and the second node.

7. A location server comprising:
    a controller to:
        compute a first time-of-flight (ToF) value based on a time-of-departure (ToD) that indicates when a probe packet is transmitted from a first node to a target node and a first time-of-arrival (ToA) that indicates when an acknowledgement (ACK) packet is received at the first node in response to the probe packet;

compute a second ToF value based on a second ToA that indicates when the probe packet from the first node is received at a second node and a third ToA that indicates when the ACK packet from the target node is received at the second node;

compute a first distance of the target node from the first node based on the first ToF value;

compute a second distance of the target node from the second node based on the second ToF value; and determine a location of the target node based on the first distance and the second distance, wherein the first node registers the ToD based on a physical layer of the first node, and the target node registers a ToA based on an arrival of the acknowledgement (ACK) packet from the first node.

8. The location server of claim 7, wherein the controller maintains information related to a plurality of nodes connected to the location server, and wherein the plurality of nodes includes the first node, the target node, and the second node.

9. The location server of claim 8, wherein the first node includes an active node communicating with the target node, wherein the second node includes a passive node listening to the communication, and wherein the communication includes a probe packet-ACK packet exchange between the first node and the target node.

10. The location server of claim 8, wherein the first and second nodes includes a first and second network access point, wherein the target node includes a client device connected to the network via the first access point, and wherein the second access point is within a communication range of the first access point and the client device.

11. The location server of claim 10, wherein the information maintained by the controller includes a medium access control (MAC) address of the client device, location information for the first access point associated with a the client device, and location information for at least one second access point within the communication range of the first access point and the client device.

12. The location server of claim 10, wherein the controller maintains an updated location of the client device, and wherein the controller sends a request for ToD data and first ToA data to the first access point and sends a request for second ToA data and ToA data to the at least one second access point, to determine the location of the client device.

13. The location server of claim 8, wherein the location server is a network access point of at least one of a wireless local area network (WLAN), a cellular network, and an ad-hoc network.

14. A non-transitory computer-readable storage medium comprising instructions that, when executed by a processor of a location server, causes the processor to:

compute a first time-of-flight (ToF) value based on a time-of-departure (ToD) that indicates when a probe packet is transmitted from a first node to a target node and a first time-of-arrival (ToA) that indicates when an acknowledgement (ACK) packet is received at the first node in response to the probe packet;

compute a second ToF value based on a second ToA that indicates when the probe packet from the first node is received at a second node and a third ToA that indicates when the ACK packet from the target node is received at the second node;

compute a first distance of the target node from the first node based on the first ToF value;

compute a second distance of the target node from the second node based on the second ToF value; and determine a location of the target node based on the first distance and the second distance, wherein the first node registers the ToD based on a physical layer of the first node, and the target node registers the ToA based on an the arrival of the ACK packet from the first node.

15. The non-transitory computer-readable storage medium of claim 14, wherein the location server is the first node, wherein the first node is an active node involved in a probe packet-ACK packet exchange with the target node, and wherein the second node is a passive node listening to the exchange between the first node and the target node.

* * * * *